United States Patent
Xia et al.

(10) Patent No.: US 8,280,202 B2
(45) Date of Patent: Oct. 2, 2012

(54) FIBER-OPTIC DYNAMIC SENSING MODULES AND METHODS

(75) Inventors: Hua Xia, Altamont, NY (US); Kevin Thomas McCarthy, Troy, NY (US); Jeffrey Scott Goldmeer, Latham, NY (US); Ertan Yilmaz, Glenville, NY (US); Ted Carlton Kreutz, Schenectady, NY (US); Clayton Ming Young, Irvine, CA (US); Russell Stephen Demuth, Berne, NY (US); Hunt Adams Sutherland, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 425 days.

(21) Appl. No.: 12/465,874

(22) Filed: May 14, 2009

(65) Prior Publication Data

US 2010/0287906 A1 Nov. 18, 2010

(51) Int. Cl.
G02B 6/00 (2006.01)

(52) U.S. Cl. ........................................... 385/13
(58) Field of Classification Search .................. None
See application file for complete search history.

(56) References Cited

U.S. PATENT DOCUMENTS

| | | | |
|---|---|---|---|
| 5,063,781 A | 11/1991 | Conforti et al. | |
| 5,186,136 A | 2/1993 | Kadomukai et al. | |
| 5,544,478 A | 8/1996 | Shu et al. | |
| 5,594,819 A | 1/1997 | Narendran et al. | |
| 5,761,956 A | 6/1998 | Beeson et al. | |
| 5,809,769 A | 9/1998 | Richards et al. | |
| 6,393,181 B1* | 5/2002 | Bulman et al. | 385/37 |
| 7,133,583 B2* | 11/2006 | Marceau et al. | 385/13 |
| 7,302,123 B2* | 11/2007 | Jones | 385/12 |
| 7,336,862 B1 | 2/2008 | Xai et al. | |
| 7,783,148 B2* | 8/2010 | Weingartner et al. | 385/120 |
| 7,796,844 B2* | 9/2010 | Tam et al. | 385/13 |
| 2003/0127587 A1 | 7/2003 | Udd et al. | |
| 2004/0057645 A1* | 3/2004 | Willner | 385/12 |
| 2004/0067003 A1* | 4/2004 | Chliaguine et al. | 385/13 |
| 2005/0180678 A1 | 8/2005 | Panepucci et al. | |
| 2005/0236559 A1 | 10/2005 | Calvert et al. | |
| 2007/0116401 A1* | 5/2007 | Xia et al. | 385/12 |
| 2010/0021106 A1* | 1/2010 | Tam et al. | 385/13 |

FOREIGN PATENT DOCUMENTS

| | | |
|---|---|---|
| JP | 2005003609 A | 1/2005 |
| WO | 9325866 A1 | 12/1993 |
| WO | 2008077255 A1 | 7/2008 |

OTHER PUBLICATIONS

M. Wippich et al., "Tunable Lasers and Fiber-Bragg-Grating Sensors," Jun./Jul. 2003, pp. 24-27, American Institute of Physics.
Search Report from corresponding EP Application No. 10162458.3-2213 dated Oct. 28, 2011.

* cited by examiner

Primary Examiner — Sung Pak
(74) Attorney, Agent, or Firm — Ann M. Agosti

(57) ABSTRACT

A fiber-optic dynamic sensing module comprises a support member, a beam extending from the support member, and a pre-strained fiber Bragg grating sensor and a strain-free fiber Bragg grating sensor mounted on the beam. The pre-strained and strain-free fiber Bragg grating sensors each comprise a Bragg grating inscribed in a fiber. The Bragg grating of the pre-strained fiber Bragg grating sensor is packaged more tightly along a longitudinal direction of the beam than the Bragg grating of the strain-free fiber Bragg grating sensor.

9 Claims, 10 Drawing Sheets

FIBER-OPTIC DYNAMIC SENSING MODULES AND METHODS

BACKGROUND

The invention relates generally to sensing technologies and, more particularly, to fiber-optic sensing modules for measurements of dynamic parameters in harsh industrial systems.

Combustion chambers such as are used in conjunction with gas turbines burn fuels in turbomachinery systems. The fuels may include natural gas or kerosene, for example, and are typically combined with air. As a result of the combustion process, such turbines emit an exhaust stream or gas containing a number of combustion products, including various forms of nitrogen oxide, collectively referred to as NOx, which is considered a pollutant. For a gas turbine, NOx emissions increase significantly as the combustion temperature rises. Operating a turbine in a so-called lean burn condition involves use of a lean mixture of fuel and air (that is, a relatively low fuel-to-air ratio) reduces the combustion temperature to a level that significantly reduces NOx emissions. Thus, sensing systems for monitoring temperature of the combustion chamber are useful in such conditions.

Power generation system combustion is closely monitored for efficiency control and optimization. During the combustion process, fuel and air are ignited and burned in a combustor, producing extremely hot gas at very high pressures. Dynamic pressure waves occur during the combustion process and have an acoustic frequency typically ranging from a few tens hertz to 30,000 hertz. If these dynamic pressure waves are not maintained at a sufficiently low vibration amplitudes, mechanical damage may occur in the combustion chamber. Further, a gas turbine lifetime decreases when the gas turbine's vibration amplitude is excessive.

Efforts have been made to monitor combustion dynamics, and one method includes employing a pressure transducer that includes a tube having one end projecting into the combustion chamber to be exposed to combustion pressure therein and another end with a piezoelectric crystal. The tube thus serves to reduce the amount of both pressure and temperature applied to the piezoelectric crystal to prolong the life of the pressure transducer. The pressure transducers are quite fragile, and frequently fail, causing difficulties and delays in testing of new turbines. Another method is to use a piezoelectric, piezoresistive, or capacitive based accelerometer or a velocity transducer to monitor a dynamic event to obtain data on vibration frequencies and amplitude. However, these types of sensors have limited usefulness in harsh environments because the piezoelectric, piezoresistive, and capacitive materials can not withstand very high temperatures.

A Fiber Bragg grating (FBG) is generally a periodic or quasiperiodic refractive index modulated structure that can be inscribed in a silicon dioxide-based photosensitive fiber to create a FBG sensor for measuring dynamic parameter, such as thermal ramping, dynamic pressure, vibration, and flow rate. Silicon dioxide has a high temperature melting property (typically higher than 1500 degrees Centigrade (2700 degrees Fahrenheit)). However, it is still challenging to use FBG sensors in harsh environments because conventional packaging for the fiber sensor protection and installation often cannot survive such harsh environments. Thus, there is a need in the art to provide a FBG based dynamic sensing module and packaging method to survive harsh environments and events.

BRIEF DESCRIPTION

In accordance with an embodiment disclosed herein, a fiber-optic sensing module comprises a support member, a beam extending from the support member, and a pre-strained fiber Bragg grating sensor and a strain-free fiber Bragg grating sensor mounted on the beam. The pre-strained and strain-free fiber Bragg grating sensors each comprise a Bragg grating inscribed in a fiber. The Bragg grating of the pre-strained fiber Bragg grating sensor is packaged more tightly along a longitudinal direction of the beam than the Bragg grating of the strain-free fiber Bragg grating sensor.

In accordance with another embodiment disclosed herein, a fiber-optic dynamic sensing module comprises a beam, and a fiber Bragg grating sensor mounted on the beam and bonded to the beam by metallic adhesive material. The Bragg sensor comprises a Bragg grating inscribed in a fiber. The metallic adhesive material has a thermal expansion coefficient that is compatible with the thermal expansion coefficient of the beam material.

In accordance with still another embodiment disclosed herein, a combustion system comprises a combustor, an injector for injecting fuel into the combustor, a combustor exhaust passage for exhaustion of gases out of the combustor, an outer wall surrounding the combustor and the combustor exhaust passage, and a fiber-optic sensing system. The outer wall defines at least one threaded hole extending into at least one of the combustor or the combustor exhaust passage. The fiber-optic sensing system comprises a support member screwed in the threaded hole, a cantilevered beam extending into the combustor or the combustor exhaust passage, and a pre-strained Bragg grating sensor and a strain-free Bragg grating sensor secured on the cantilevered beam.

In accordance with still another embodiment disclosed herein, a method comprises obtaining a fiber-optic sensing module. The fiber-optic sensing module comprises a support member, a cantilevered beam extending from the support member, and a pre-strained fiber Bragg grating sensor and a strain-free fiber Bragg grating sensor secured on the cantilevered beam. The method further comprises attaching the fiber-optic dynamic sensing module in a pre-existing hole of a machine.

DRAWINGS

These and other features, aspects, and advantages of the present invention will become better understood when the following detailed description is read with reference to the accompanying drawings in which like characters represent like parts throughout the drawings, wherein.

Figure 3:
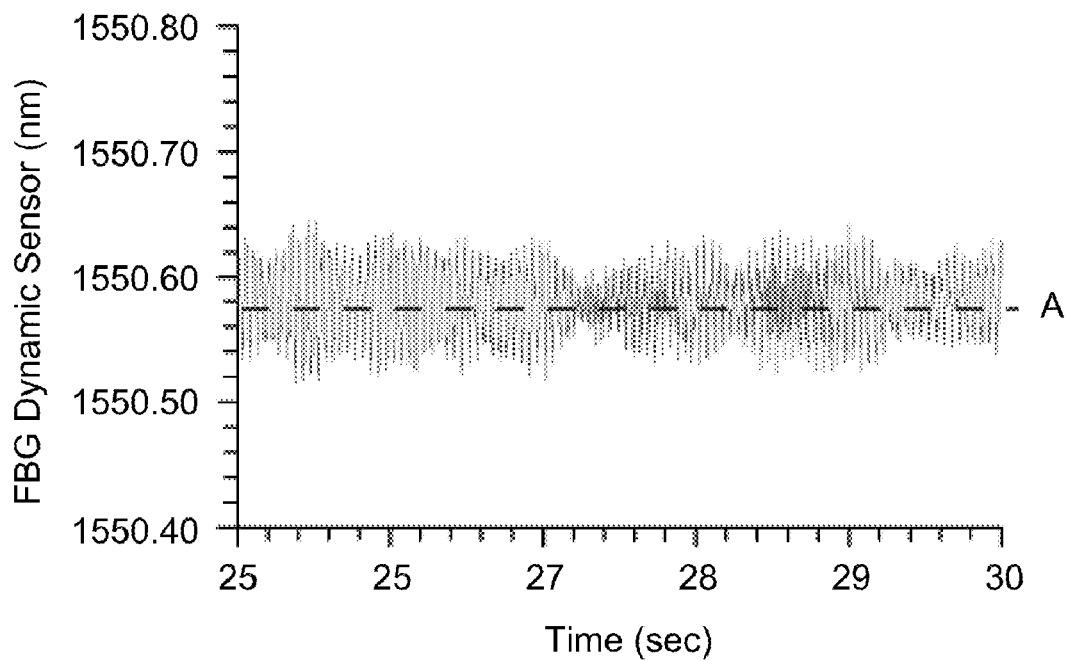
Figure 4:
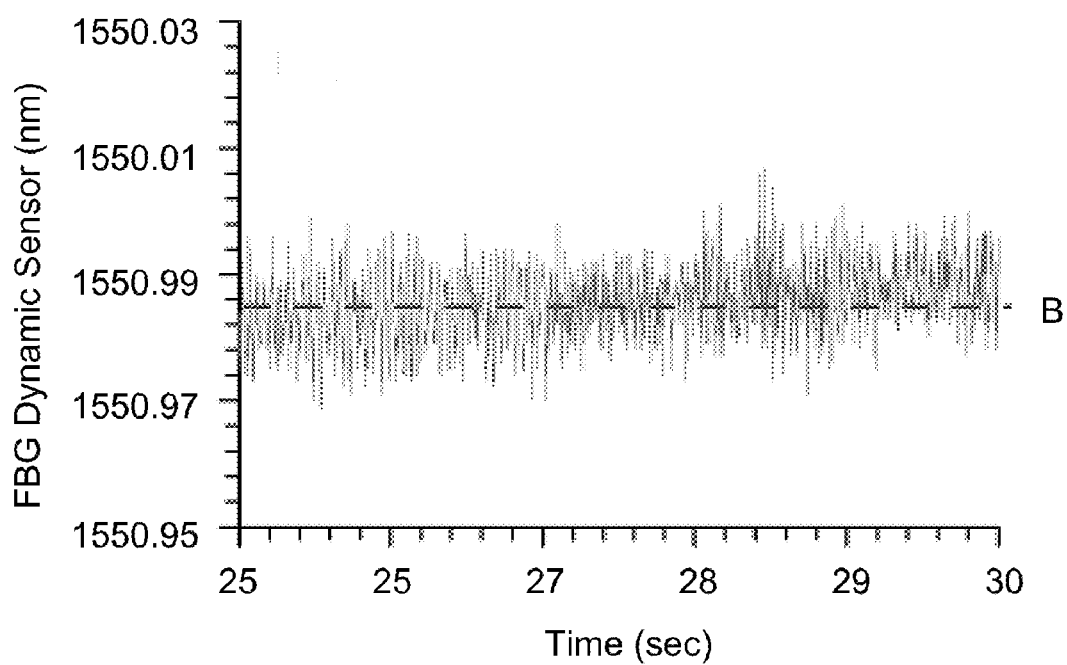

FIGS. 3 and 4 respectively illustrate exemplary wavelength spectrums of in the pre-strained FBG sensor under different vibration excitation levels and under the same steady temperature.

Figure 5:
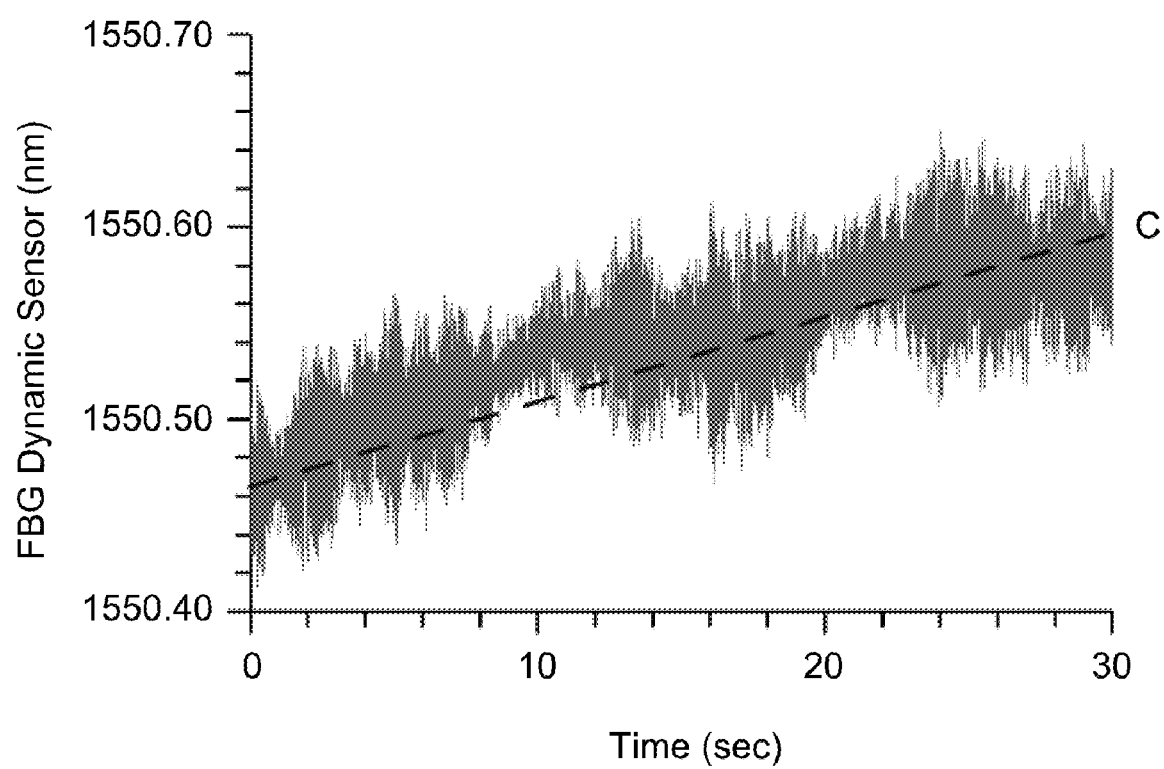

FIG. 5 is an exemplary wavelength shift of the pre-strained FBG sensor in time domain response to temperature increases from 540 to 560 Fahrenheit and external vibration excitation at about 20 Hz.

Figure 6:
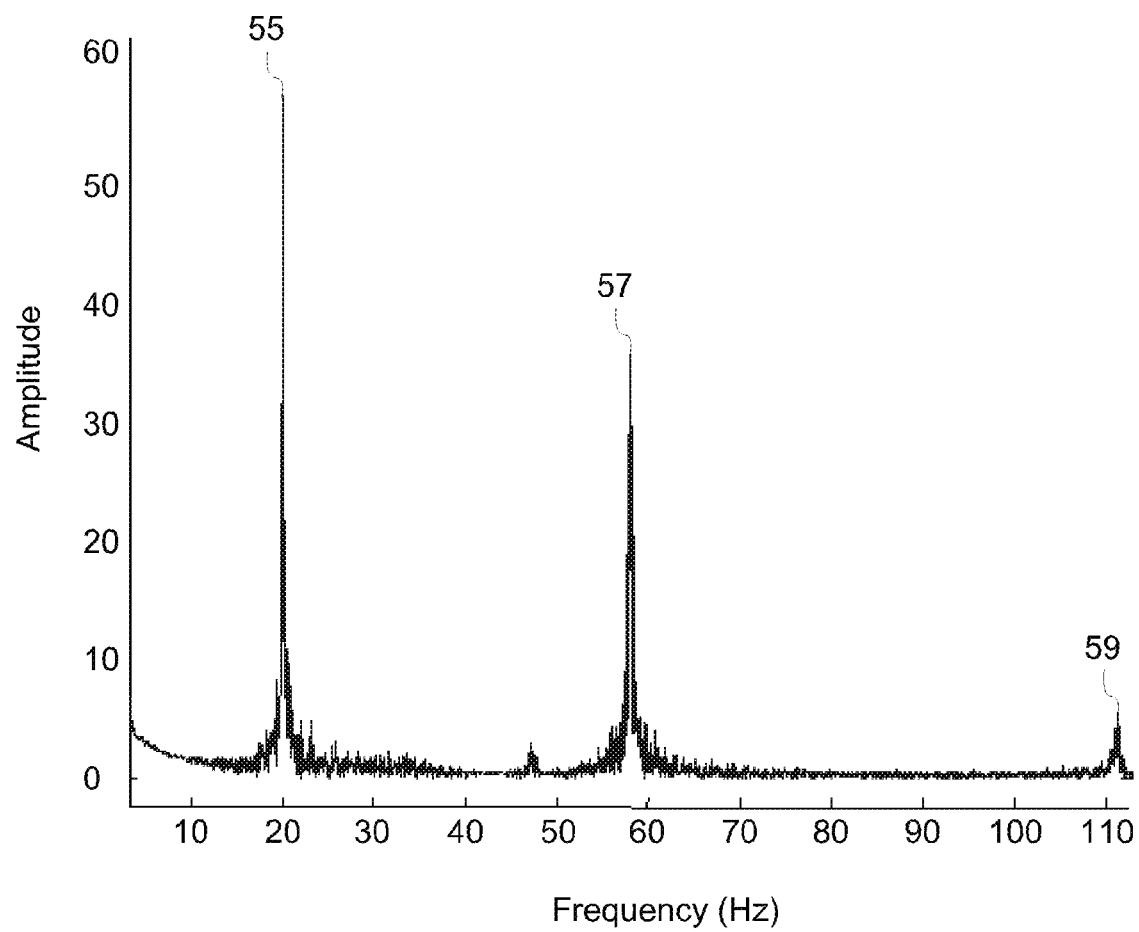

FIG. 6 is an exemplary vibration amplitude spectrum of two vibration modes from the pre-strained FBG sensor in a frequency domain.

Figure 1:
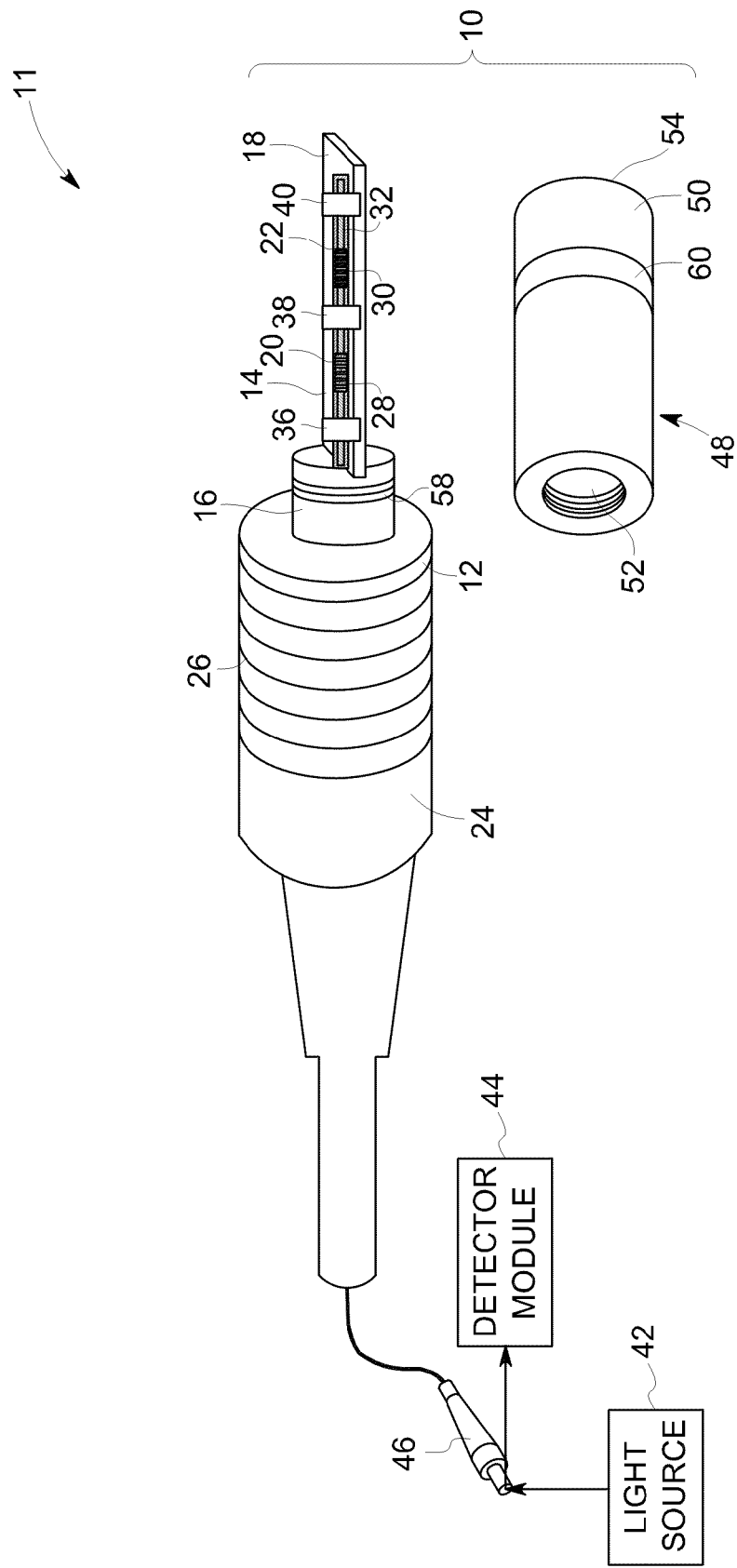
FIG. 1 is a simplified exploded view of an exemplary fiber-optic sensing module according to one embodiment of the invention.
Figure 7:
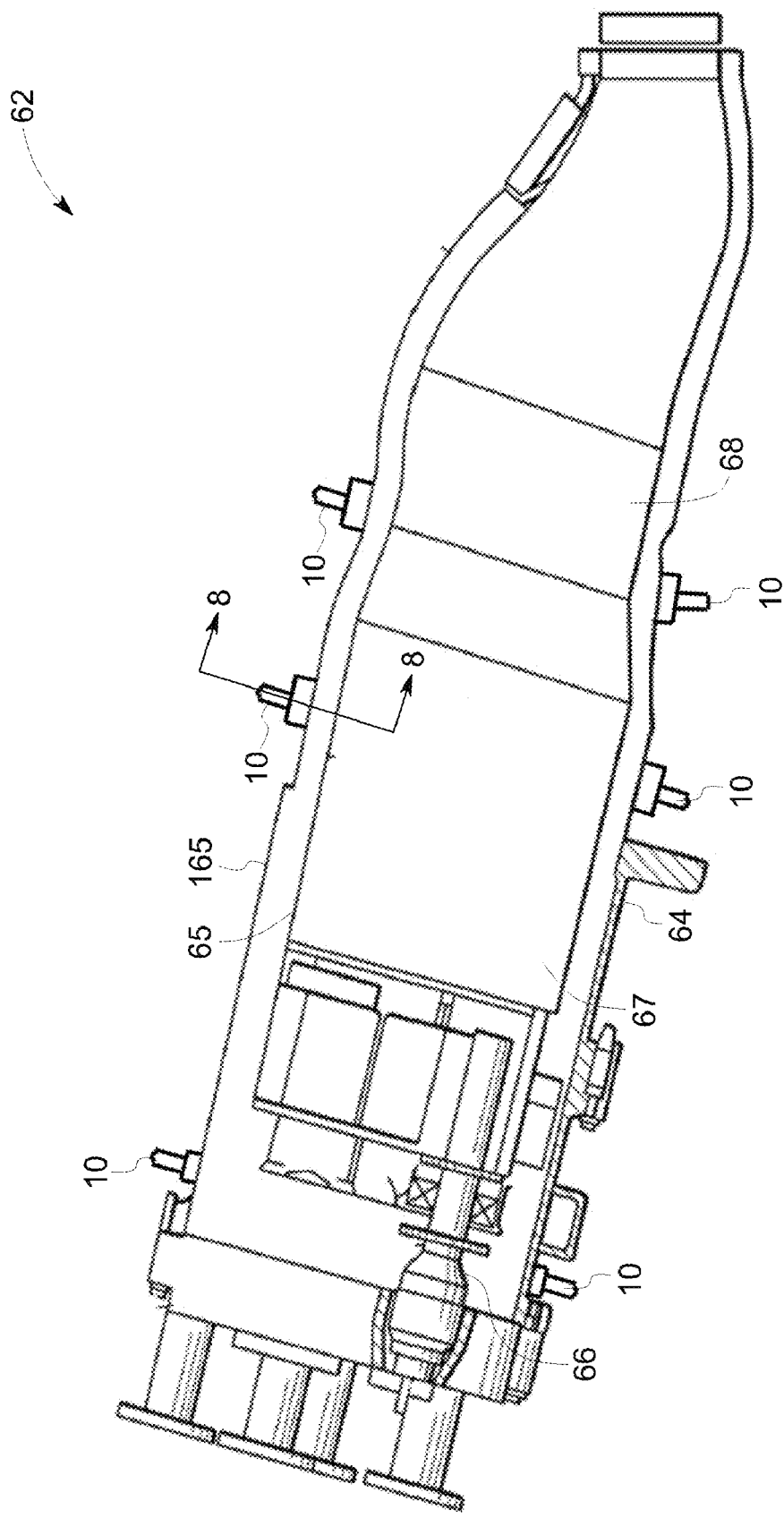

FIG. 7 is an exemplary side view of a combustor system equipped with the fiber-optic sensing module of FIG. 1.

Figure 8:
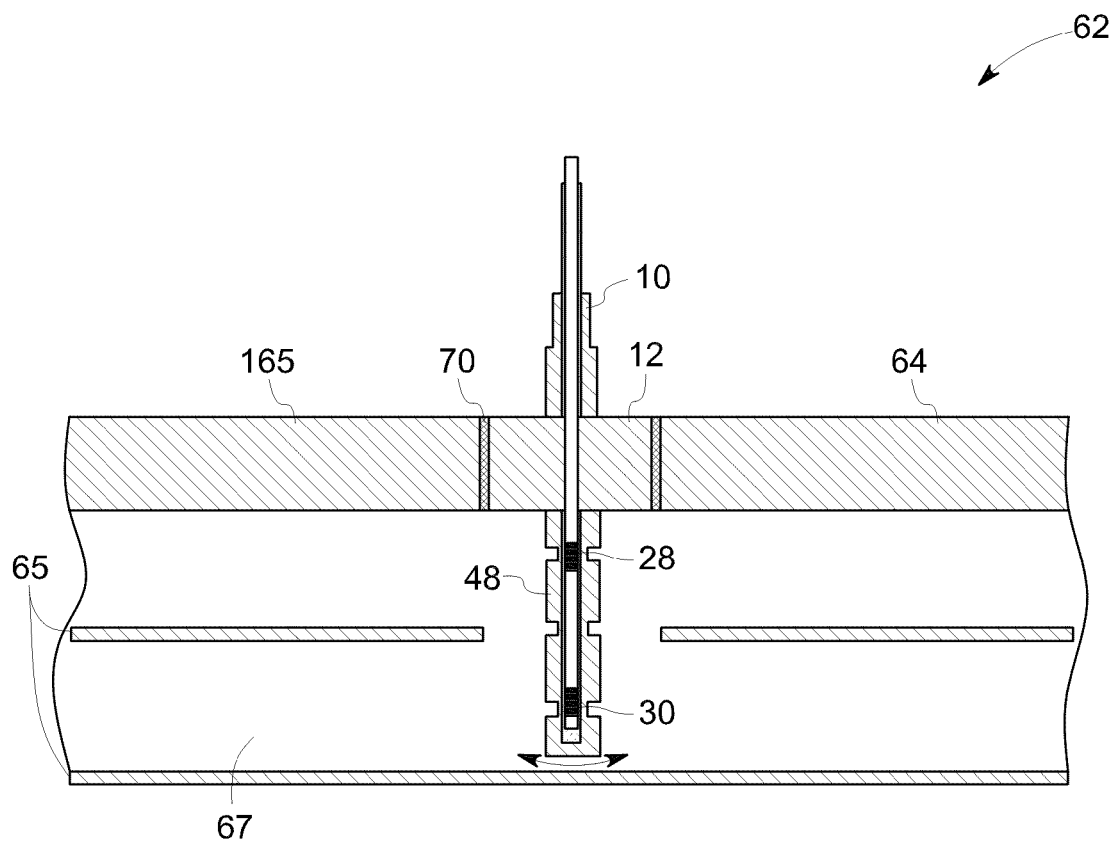

FIG. 8 is a partially cross-sectional view of the combustion system of FIG. 7 with the installed fiber-optic sensing module.

Figure 9:
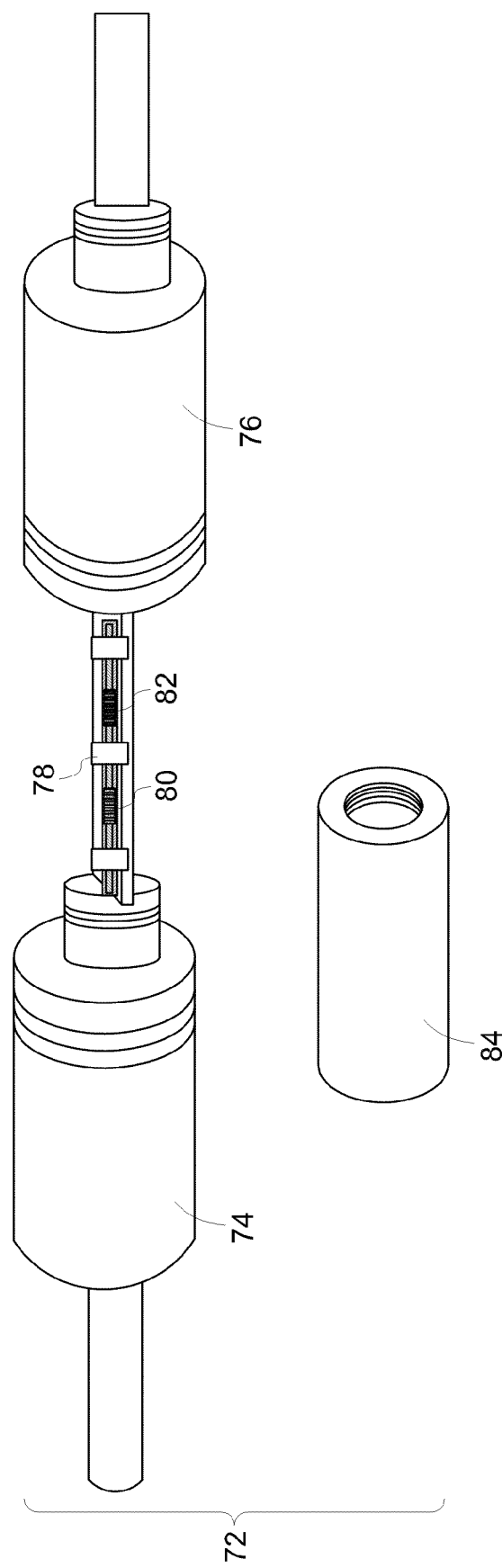

FIG. 9 is a simplified exploded view of a fiber-optic sensing module according to another embodiment of the invention.

Figure 10:
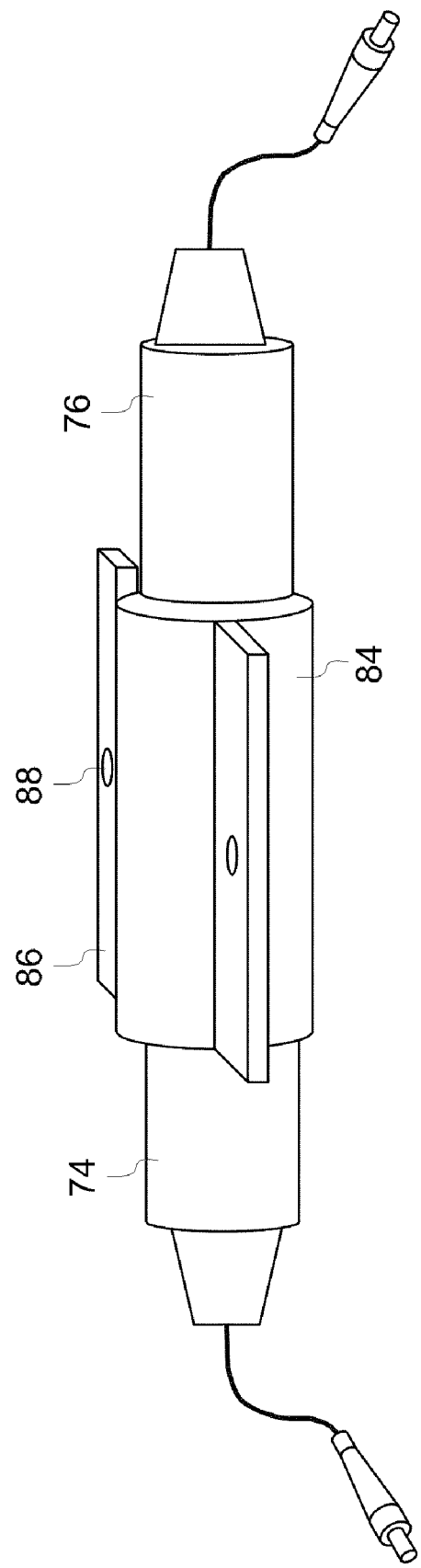

FIG. 10 is a simplified perspective view of a packaged fiber-optic sensing module of FIG. 9.

Figure 11:
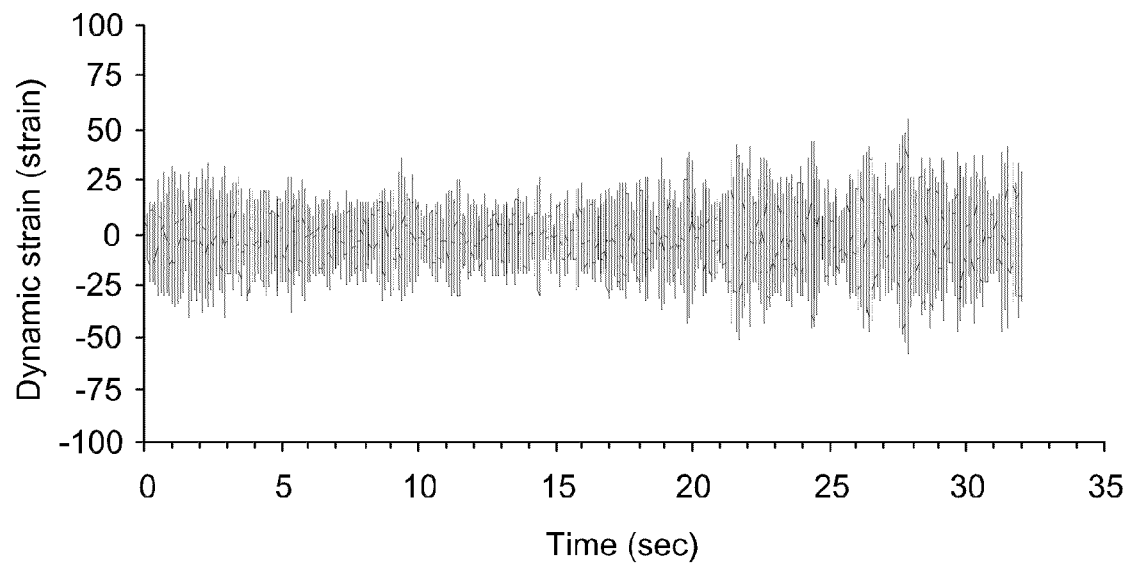
Figure 12:
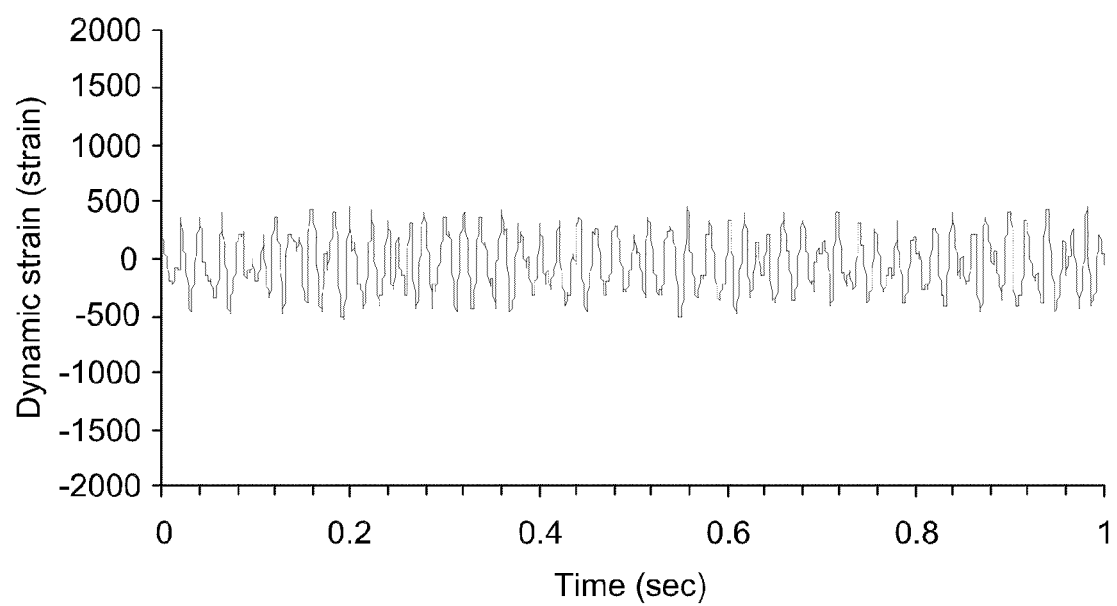

FIGS. 11 and 12 illustrate an example of dynamic strain on the pre-strained FBG sensor respectively at start-up of a gas turbine and during a steady operation of the gas turbine with certain time periods.

DETAILED DESCRIPTION

Embodiments of the invention disclose fiber-optic dynamic sensing modules for measurements of dynamic parameters of a combustor or an industrial environment including at least temperature and vibration parameters. The fiber-optic sensing module includes at least one pre-strained fiber Bragg grating (FBG) sensor and at least one strain-free FBG sensor, which respectively each include a Bragg grating inscribed in an optical fiber. The transient and dynamic process, induced by the event of a combustion, fast startup, ignition etc, can be monitored by relative resonant wavelength change of the Bragg gratings of the pre-strained and strain-free FBG sensors. The relative wavelength changes can be used to calculate different dynamic parameters such as transient temperature, structural vibration frequency, vibration amplitude, dynamic strain, or combinations thereof. Although the embodiments discussed below are focusing on sensing devices and systems for power generation equipment for purposes of illustration, the invention is not limited to the power generation sensing field, but is also applicable to other sensing fields, such as, industrial structural health monitoring, oil and gas, signaling in transportation, and homeland security. For purposes of simplicity of description, common elements across different embodiments share the same reference numbers.

Figure 2:
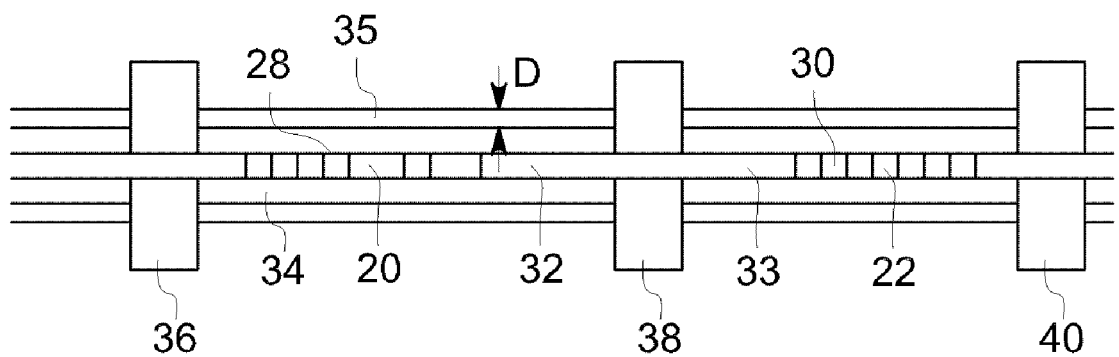
FIG. 2 is a partially cross-sectional view of the fiber-optic sensing module of FIG. 1 illustrating pre-strained and strain-free Bragg gratings respectively.

Referring to FIGS. 1 and 2, an exemplary fiber-optic dynamic sensing module 10 in accordance with one embodiment of the invention for measurement of dynamic parameters such as transient temperature and structural vibration is illustrated. The exemplary fiber-optic sensing module 10 includes a support member 12 to be mounted to a machine, a cantilevered beam 14 having one mounting end 16 secured with support member 12 and a free arm 18 extending from the mounting end 16 in a direction away from support member 12, and a pre-strained FBG senor 20 and a strain-free FBG sensor 22 both secured on free arm 18 of cantilevered beam 14. In certain embodiments, free arm 18 and mounting end 16 comprise austenitic nick-chromium-based superalloys, Invar™ (Carpenter Steel Company), Kovar™ (Scientific Alloys Inc.), titanium, stainless steels, nickel-cobalt ferrous alloys, or nickel steel alloys such as FeNi36, for example. In certain embodiments, support member 12 is provided with a mounting portion for securing the support member 12 to a machine. In the illustrated embodiment, the mounting portion of support member 12 is a column 24 with threads 26 in an outer surface of column 24 for screwing to the machine.

In the illustrated embodiment, fiber-optic dynamic sensing module 10 is used in a fiber-optic sensing system 11 which further comprises a light source 42 for transmitting light through fiber 32 to the Bragg gratings 28, 30, and a detector module 44 for receiving light reflected from Bragg gratings 28, 30. The fiber-optic dynamic sensing system 11 may also include an optical coupler 46 to manage incoming light from the light source 42 as well as the reflected signals from the Bragg gratings 28, 30. The coupler 46 directs the appropriate reflected signals to detector module 44.

The detector module 44 receives the reflected optical signals from the Bragg gratings 28, 30 and, in cooperation with various hardware and software components, analyzes the embedded information within the optical signals. In one embodiment, the detector module 44 is configured to estimate a condition or a parameter of the environment based upon a reflection spectrum generated from the grating structures 28, 30 of the pre-strained and strain-free FBG sensors 20, 22, respectively. In certain embodiments, the detector module 44 employs an optical spectral analyzer to analyze signals from the Bragg gratings 28, 30. Depending on a desired application, the detector module 44 may be configured to measure various parameters in the environment. The information determined by the detector module 44 may be communicated to an output (not shown) such as, a display or a wireless communication device.

As can be best seen in the embodiment of FIG. 2, pre-strained and strain-free FBG sensors 20 and 22 may include a periodic or a quasiperiodic modulated Bragg grating 28, 30 inscribed in a fiber 32. Fiber 32 comprises a core 33 and a cladding 34 surrounding core 33. In one embodiment, fiber 32 further comprises a metal coating 35 enclosing cladding 34. Metal coating 35 may comprise nickel, a copper nickel alloy, aluminium, gold, or silver. In one embodiment, metal coating 35 has a thickness D ranging from 10 micrometers to 20 micrometers. Pre-strain hereinafter refers to the fact that the pre-strained Bragg grating 28 and the fiber section are tightened along a longitudinal direction of the fiber 32. Strain-free hereinafter refers to a Bragg grating 30 being more loosely packaged along the longitudinal direction of the fiber 30 (typically without being tightened). In other embodiments, fiber-optic dynamic sensing module 10 may include two or more fibers, and Bragg gratings 28, 30 of pre-strained and strain-free FBG sensors 20, 22 may be respectively inscribed in two fibers. In certain embodiments, fiber-optic dynamic sensing module 10 may comprise a plurality of pre-strained and strain-free FBG sensors 20, 22 for a multi-point measurement across an infrastructure such as a turbomachinery system.

The Bragg gratings 28, 30 and cladding 34 may be of types described and illustrated in commonly assigned U.S. Pat. No. 749,605, U.S. Pat. No. 7,336,862, and U.S. Pat. No. 7,421,162, the disclosures of which are incorporated herein by reference. In one example, the Bragg gratings 28, 30 comprise nanocrystalline tetrahedral structures that have been obtained by first using laser inscription and phase mask method following a post-annealing process on a Ge/F co-doped single-mode photosensitive fiber. Such tetrahedral FBG sensors 20, 22 may be thermally stabilized up to 2000° F.

In one embodiment, pre-strained FBG sensor 20 is mounted adjacent to the mounting end 16 of the cantilevered beam 14 where strain induced by vibration of the machine to be measured is most strong. In one embodiment, pre-strained FBG sensor 20 includes a pair of restriction blocks 36, 38 securing two points of the fiber 30 to arm 18, and the fiber 30 between the pair of restriction blocks 36 and 38, with the Bragg grating 28 inscribed thereon, is tightened to provide the pre-strained FBG sensor 20 that is more sensitive to strain induced by instability or vibration of the machine to be measured than strain free FBG sensor 22.

In one embodiment, the strain-free FBG sensor 22 is mounted adjacent to a free end of the arm 18 wherein strain induced by vibration of the machine is smallest. The strain-free FBG sensor 22 includes a pair of restriction blocks 38, 40 securing two points of the fiber 32 to arm 18, and the Bragg grating 30 and the corresponding fiber section between the pair of restriction blocks 38, 40 are strain-free (with strain free herein meaning that the Bragg grating of the fiber between blocks 38 and 40 is less tightly packaged along the longitudinal direction of the beam than the Bragg grating of the fiber between blocks 36 and 38). Thus wavelength shifts of the Bragg grating 30 of the strain-free Bragg sensor 22 occur primarily due to temperature instead of strain induced by instability or vibration in the measured environment.

In one embodiment, a method of fabricating the pre-strained and strain-free FBG sensors 20, 22 comprises inscribing Bragg gratings 28, 30 onto fiber 32. Bragg gratings 28, 30 may be inscribed onto the fiber 32 using an ultraviolet pulse laser or a femtosecond pulse laser, for example, and a phase mask technology to inscribe Bragg gratings 28, 30 onto a single-mode fiber such as a photosensitive or pure quartz fiber 32. In certain embodiments, the obtained Bragg gratings 28, 30 may further experience a band-gap-engineering process to eliminate intra-bands between conduction and convention bands of the silicon dioxide material. Such a process could provide a thermal stabilized dynamic FBG sensing module package.

In certain embodiments, pre-strained and strain-free FBG sensors 20, 22 may be secured to free arm 18 of cantilevered beam 14 with a soldering method. For example, in certain embodiments wherein temperatures do not exceed 400 degrees centigrade (750 degrees Fahrenheit), pre-strained and strain-free FBG sensors 20, 22 may be secured to free arm 18 of cantilevered beam 14 by using a glass-based soldering material. In anther embodiment at more elevated temperatures, Sb, Sn, or Au based high-temperature soldering materials are used. In one embodiment, the fiber cladding is metalized with a thin layer (for example 1 μm-25 μm) of Ni, Cu/Ni, Al, or Au materials.

In certain embodiments, pre-strained and strain-free FBG sensors 20, 22 may be secured to free arm 18 of cantilevered beam 14 with a mechanical clamping fixture (not shown). In certain embodiments, pre-strained and strain-free FBG sensors 20, 22 may be secured to free arm 18 of cantilevered beam 14 by using a metallic adhesive material for being used in high temperature at least up to 1200° F. In one embodiment, the metallic adhesive material comprises a combination of metal and ceramic materials. Ceramics have high temperature melting properties, and metals have larger thermal expansion coefficients and flexibility than ceramics. Further, the selection of the metallic adhesive material will also depend upon the selected material of free arm 18. Thus, by varying the proportion of metals and ceramics in the adhesive material, the adhesive material can have a compatible thermal expansion coefficient to the free arm 18, and, a sufficiently high temperature melting property. As used herein "compatible" means that the coefficients of thermal expansion of the adhesive and free arm material are close enough so that the free arm remains secure under intended operating temperatures of the sensor system. In one embodiment, for example, the thermal expansion coefficient difference between the metallic adhesive material and the free arm material at 1000° F. is less than 10% of the thermal expansion coefficient of the free arm material. In certain embodiments, the melting temperature of the metallic adhesive material is above 2000° F. In one embodiment, the bonding strength of the metallic adhesive material can withstand pressures up to 1400 psi. Metals used in the metallic adhesive may comprise aluminum, stainless steel, nickel, and combinations thereof. For example, aluminum based metallic adhesive material can withstand temperatures up to 1200° F. and has a $10 \times 10^{-6}/°$ F. coefficient of thermal expansion (CTE) whereas nickel ((CTE)=$4 \times 10^{-6}/°$ F.) and stainless steel ((CTE)=$10 \times 10^{-6}/°$ F.) based metallic adhesive materials could be used at higher temperatures up to 2000° F. In certain embodiments, the metallic adhesive material may be used for bonding fibers to a support or a beam in any fiber-optic sensing modules and is thus not limited to use in the specific pre-strained and strain-free FBG sensors 20, 22 embodiment of FIGS. 1 and 2.

In certain embodiments, a process for attaching the pre-strained FBG sensor 20 is to mount one end of the FBG sensor 20 on the free arm 18 with metallic adhesive material and to then bond the other end of the FBG sensor 20 while stretching it so that some tension results after bonding of the second end. In one embodiment, the strain-free FBG sensor 22 is attached by loosely setting a FBG sensor on the free arm 18 with two sides bonded simultaneously with the metallic adhesive material.

In the illustrative embodiment of FIG. 1, the exemplary fiber-optic sensing module 10 is hermetically packaged and further comprises a cap 48 for protection of the fiber 32 and Bragg gratings 28, 30. In the illustrated embodiment, cap 48 comprises the same material as beam 14 and includes a sleeve 50 with an open end 52 and a closed end 54. In one embodiment, open end 52 of cap 48 comprises a threaded inner surface 56, and mounting end 16 of cantilevered beam 14 comprises a threaded outer surface 58 for detachably engaging with the threaded inner surface of cap 48. In other embodiments, threaded outer surface may be arranged on support member 12. In the illustrated embodiment, cap 48 further comprises a circular depressed portion 60 in an outer peripheral thereof and at a location corresponding to the Bragg grating 30 of the strain-free FBG sensor 22 so that wavelength shift of the Bragg grating 22 is more sensitive to temperature change of the environment outside of cap 48.

During measurements, when light from light source 42 is transmitted through fiber 32 to Bragg gratings 28 and 30 of pre-strained and strain-free FBG sensors 20, 22, light energy is reflected by the Bragg gratings 28, 30 at corresponding Bragg wavelengths $\lambda_{Bv}, \lambda_{Bt}$, given by equation 1:

$$\lambda_B = 2n_{eff}\Lambda, \qquad \text{equation 1}$$

wherein "$n_{eff}$" is effective refractive index of the fiber core, and "$\Lambda$" is the periodicity of the corresponding grating modulation structure. In one embodiment, Bragg gratings 28, 30 have different modulation period, $\Lambda_1$ and $\Lambda_2$, whereby detector module 44 can differentiate the spectrums respectively reflected from Bragg gratings 28, 30.

Wavelength shifts of Bragg wavelengths ($\Delta\lambda$) are a function of temperature (T) according to equation 2:

$$\Delta\lambda(T) = \lambda_B(\alpha+\beta)\Delta T, \qquad \text{equation 2}$$

wherein $\alpha$ and $\beta$ are thermal expansion and thermo-optic coefficients of the fiber material during ambient conditions.

Both the effective index of refraction ($n_{eff}$) and the periods ($\Lambda$) of the corresponding Bragg gratings 28, 30 are functions of temperatures and strains applied to the Bragg gratings. For the strain-free FBG sensor 20, as the Bragg grating 30 is loosely packaged, strain does not contribute or contributes very little to the wavelength change of the Bragg grating 30. Accordingly, the transient or dynamic wavelength shift, as a function of time, t, and temperature T, $\Delta\lambda_B$ of the Bragg grating 30 is according to equation 3:

$$\Delta\lambda_B(T,t) = K_T\Delta T(t) \qquad \text{equation 3}$$

wherein $K_T = \lambda_B \cdot (\alpha+\beta)$ is regarded as a constant at first approximation (while ignoring thermal dependencies for certain operational temperature ranges). The transient or dynamic wavelength change of Bragg grating 30 received by detector module is thus an indication of temperature to be measured at a specific time, t.

For the pre-strained optic sensor 18, wavelength change is induced by both thermal and strain dynamics within a certain time period (t) according to equation 4:

$$\Delta\lambda_B(T,t)=K_\epsilon\epsilon(T,t)+K_T\Delta T(t) \quad \text{equation 4}$$

wherein $K_\epsilon$ and $K_T$ are respectively strain and temperature sensitivities of the pre-strained FBG sensor 18. In most cases, a dynamic event may produce an oscillation that span a frequency range from 10 Hz to a few kHz, such as 50-60 Hz for a 7FA/7FB/9FA gas turbine, 130-160 Hz for a combustor, and 0.2-10 kHz for an aircraft engine bearing. On the other hand, in some applications, dynamic events may occur at higher frequencies and occur much more quickly than temperature changes occur. On a wavelength spectrum of the Bragg grating 28, a relatively steady component of the wavelength spectrum in a certain time period (t) is an indication of temperature, but the wavelength shifts induced by certain dynamic events can be described by both vibration frequency and vibration amplitude, through a mathematical analysis on dynamic strain exerted on the Bragg grating. Separation between the slow varied thermal response and the transient dynamic response can be done by analyzing wavelength shifts within certain time intervals, such that the temperature variation could be ignored. Thus, the averaged wavelength shift is mainly associated with temperature change, while standard deviation or root means square (RMS) of the wavelength shift of the Bragg grating 30 represents dynamic strain that is associated with the vibration amplitude of a structure.

FIG. 3 illustrates an exemplary wavelength spectrum of Bragg grating 28 in pre-strained FBG sensor 20 under a vibration excitation with a vibration amplitude of 100 pm and a steady temperature of 560° F. FIG. 4 illustrates an exemplary wavelength spectrum of Bragg grating 28 in pre-strained FBG sensor 20 under a vibration excitation with a vibration amplitude of 20 pm and a steady temperature of 560° F. Steady components, shown as line A and B of the wavelength shifts, are substantially constant and do not change significantly due to different vibration amplitudes.

FIG. 5 illustrates an exemplary wavelength spectrum of Bragg grating 28 in pre-strained FBG sensor 20 in response to combined thermal and dynamic effects, wherein the temperature changes from 540° F. to 560° F., and a dynamic vibration frequency of 20 pm. A steady component, line C, is an indication of temperature change. The dynamic changes create the envelope. The wavelength shift amplitude of pre-strained FBG sensor can thus be correlated with the external structural vibration amplitude. In one embodiment, the dynamic changes can be obtained by using signal processing techniques known to those in the art such as the Fast Fourier analysis, Hilbert-Huang Transforms, or other signal processing techniques.

FIG. 6 is frequency spectrum of the fiber dynamic sensor obtained by Fast Fourier Transformation (FFT). Accordingly, a substantially steady component shown as phantom line C of the wavelength spectrum of FIG. 5 is an indication of temperature of the environment within the time period (t). In accordance with the invention, the measured wavelength shift from a fiber dynamic sensing module 10 passes it to a Fast Fourier Transform (FFT) algorithm, the output of which represents the frequency spectrum of the structural vibration or combustion instability induced vibration. The Hilbert Huang transform may be used as a pre-conditioner to the FFT analysis. The frequency spectrum is considered one form of signature of the particular combustion instability signal detected.

In the illustrated embodiment of FIG. 6, the physical quantities may be calculated from the measurement of each frequency in the frequency spectrum. In practice, the FFT typically produces an imperfect spectrum that may include a number of phantom peaks along with a true peak. Determination of dynamic strain and associated vibration harmonic measurements of interest may be improved through use of a noise elimination method. In accordance with one embodiment of the invention, the phantom peaks are filtered so as to produce a more accurate measurement of the frequency and the physical quantity in turn. One exemplary filtering method is to detect the position of the frequency in the spectrum by calculating the centroid of the area under each peak of interest in the spectrum.

Referring to FIGS. 7 and 8, an exemplary combustion system 62 of a gas turbine equipped with at least one fiber-optic dynamic sensing module 10 for measurements of dynamic parameters of combustion system 62 is illustrated. The exemplary combustion system 62 comprises a combustor 64 for reaction of the fuel-air mixture, an injector (fuel nozzle) 66 for injecting a mixture of fuel and air into the combustor 64, and a combustor exhaust passage 68 for exhaustion of combustion products which result from combustion of the fuel-air mixture in combustor 64. Inner and outer walls such as combustor liner 65 and casing 165 typically surround combustion chamber 67, injector 66 and combustor exhaust passage 68. In certain embodiments, the fiber-optic dynamic sensing module 10 may be mounted on the outer wall 165 in the region of the combustor 64, and/or injector 66, and/or of combustor exhaust passage 68.

FIG. 8 is an exemplary enlarged partial cross-sectional view of combustion system 62 of a gas turbine for illustrating one fiber-optic dynamic sensing module 10. In the illustrated embodiment, combustor 64 comprises a combustion chamber 67 enclosed by inner and outer walls 65, 165 with at least one threaded hole 70 extending through outer wall 165 for mounting fiber-optic sensing module 10 to combustor 64. In certain embodiments, the combustion system 62 was originally equipped with pressure sensors and/or thermocouples mounted in threaded holes 70 for measurement of temperature and/or vibration parameters of the combustor 64. Pressure sensors/thermocouples may be replaced by the fiber-optic dynamic sensing module 10 during repair or reconstruction, whereby it is not required to produce new holes for mounting the fiber-optic sensing module 10. In other embodiments, at least one of the holes 70 is specially produced for mounting the fiber-optic sensing module 10 to combustor 64.

In the embodiment of FIG. 8, threaded hole 70 is provided with inner threads engaging with outer threaded outer surface 58 of support member 12 of fiber-optic sensing module 10 for screwing the fiber-optic sensing module 10 to the combustor. In one embodiment, support member 12 of the fiber-optic dynamic sensing module 10 is produced from the same material as the outer wall 165, and accordingly has the same coefficient of thermal expansion as the outer wall 165. The cantilevered beam 14, together with the pre-strained and strain-free FBG sensors 20, 22 (FIG. 1) extends into the combustor 64, and thus temperature and vibration changes within combustor 64 result in changes on wavelength spectrum of Bragg gratings 28, 30. By monitoring the wavelength changes of Bragg gratings 28, 30, temperature, vibration frequency, vibration amplitude, and/or dynamic strain may be obtained.

FIGS. 9 and 10 illustrate a fiber-optic sensing module 72 according to another embodiment of the invention which comprises first and second support member 74, 76, a beam 78 having two opposite ends respectively secured to the first and second support members 74, 76, and pre-strained and strain-free FBG sensors 80, 82 mounted on beam 78. The pre-strained and strain-free FBG sensors 80, 82 may be similar to those discussed with respect to FBG sensors 20, of FIGS. 1 and 2, for example. This sensing module enables multiple sensing modules to be cascaded and simultaneously interrogated with one sensing system.

Referring to FIG. 10, the fiber-optic sensing module 72 may further comprise a cover 84 engaging with the first and second support members 74, 76 for encasing and protecting pre-strained and strain-free FBG sensors 80, 82 therein. In certain embodiments, cover 84 may be secured with first and second support members 74, 76 by screwing, or by bolting. In the exemplary embodiment shown in FIG. 10, the securing portion comprises a pair of ears 86 extending laterally. Each ear 86 comprises a hole 88 for screwing or bolting to the machine. During measurements, temperature of surrounding environment can be translated from wavelength shifts of strain-free FBG sensor 82. Vibration frequency, vibration amplitude, and/or dynamic strains can be obtained from vibration spectrum of the pre-strained FBG sensor 80.

The measured wavelength shift from a fiber-optic dynamic sensing module is proportional to dynamic strain by equation 5, $$\epsilon(T,t) \approx \Delta \lambda_B(T,t)/K_\epsilon \qquad \text{equation 5}$$

and accordingly, the measured transient wavelength shift can be directly associated with vibration amplitude from the sensing object such as a gas turbine. This is verified by the example of FIGS. 11 and 12. Referring to FIG. 11, before start-up of the gas turbine, within 15 seconds, the dynamic strain measured accordingly to wavelength shifts of the fiber sensors is about ±30 με. During start-up, the measured dynamic strain is gradually increased to about ±60 με within 15 seconds. Rotation of rotor blades causes the gas turbine to have a fundamental vibration at about 60 Hz with a varying vibration amplitude. Referring to FIG. 12, during a steady operation, a constant dynamic strain measured is about ±500 με. Such a dynamic strain is correlated to vibration amplitude of 20 mm from gas turbine. The dynamic strain could be used to evaluate a combustion process induced whole turbomachinery system structural integrity and operation conditions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A fiber-optic dynamic sensing module, comprising:
    a support member for mounting the fiber-optic dynamic sensing module to a machine;
    a beam extending from the support member; and
    a pre-strained fiber Bragg grating sensor and a strain-free fiber Bragg grating sensor mounted on the beam, the pre-strained and strain-free fiber Bragg grating sensors each comprising a Bragg grating inscribed in a fiber, the Bragg grating of the pre-strained fiber Bragg grating sensor being packaged more tightly along a longitudinal direction of the beam than the Bragg grating of the strain-free fiber Bragg grating sensor;
    wherein the beam comprises a mounting end secured to the support member and a cantilevered free arm extending from the mounting end in a direction away from the support member, wherein the pre-strained fiber Bragg grating sensor is mounted on the beam in a region closer to the mounting end than the strain-free fiber Bragg grating sensor.

2. The fiber-optic dynamic sensing module of claim 1 further comprising:
    a light source for transmitting light to the Bragg gratings of the pre-strained and strain-free fiber Bragg grating sensors; and
    a detector module for receiving light reflected from the Bragg gratings of the pre-strained fiber Bragg grating sensor and the strain-free fiber Bragg grating sensor and using the light from the strain-free fiber Bragg grating sensor to determine temperature and the light from the pre-strained fiber Bragg grating sensor to determine vibration frequency and vibration amplitude by dynamic strain.

3. The fiber-optic dynamic sensing module according to claim 1 further comprising a cap engaging with the support member and encasing the beam in the cap.

4. The fiber-optic dynamic sensing module according to claim 3, wherein the cap comprises a circular depressed portion in an outer peripheral thereof and at a location corresponding to the Bragg grating of the strain-free fiber Bragg grating sensor.

5. The fiber-optic dynamic sensing module according to claim 3, wherein the cap comprises a sleeve having a closed end and an open end, the open end comprising inner screw surface for screwing to the support member.

6. A combustion system comprising:
    a combustor;
    an injector for injecting fuel into the combustor;
    a combustor exhaust passage for exhaustion of gases out of the combustor;
    an outer wall surrounding the combustor and the combustor exhaust passage, the outer wall defining at least one threaded hole extending into at least one of the combustor or the combustor exhaust passage; and
    a fiber-optic dynamic sensing module comprising:
        a support member having an outer threaded outer surface screwed in the threaded hole;
        a cantilevered beam extending from the support member and extending into the combustor or the combustor exhaust passage; and
        a pre-strained Bragg grating sensor and a strain-free Bragg grating sensor secured on the cantilevered beam.

7. The combustion system of claim 6 further comprising a light source for transmitting light to the Bragg gratings of the pre-strained and strain-free fiber Bragg grating sensors; and a detector module for receiving light reflected from the Bragg gratings of the pre-strained fiber Bragg grating sensor and the strain-free fiber Bragg grating sensor and using the light from the strain-free fiber Bragg grating sensor to determine temperature and the light from the pre-strained fiber Bragg grating sensor to determine vibration frequency and vibration amplitude.

8. The combustion system of claim 7, wherein the detector module is configured for detecting a wavelength shift from the pre-strained fiber Bragg grating sensor, passing the detected wavelength shift through a Fast Fourier Transform algorithm to obtain a spectrum, and determining dynamic strain and associated vibration harmonic measurements of interest through use of a noise elimination method.

9. The combustion system of claim 8 wherein the noise elimination method includes calculating a centroid of an area under each frequency peak of interest.

* * * * *